W. H. JOHNSON.
Sewing Machine.
No. 9,665. Patented April 12, 1853.
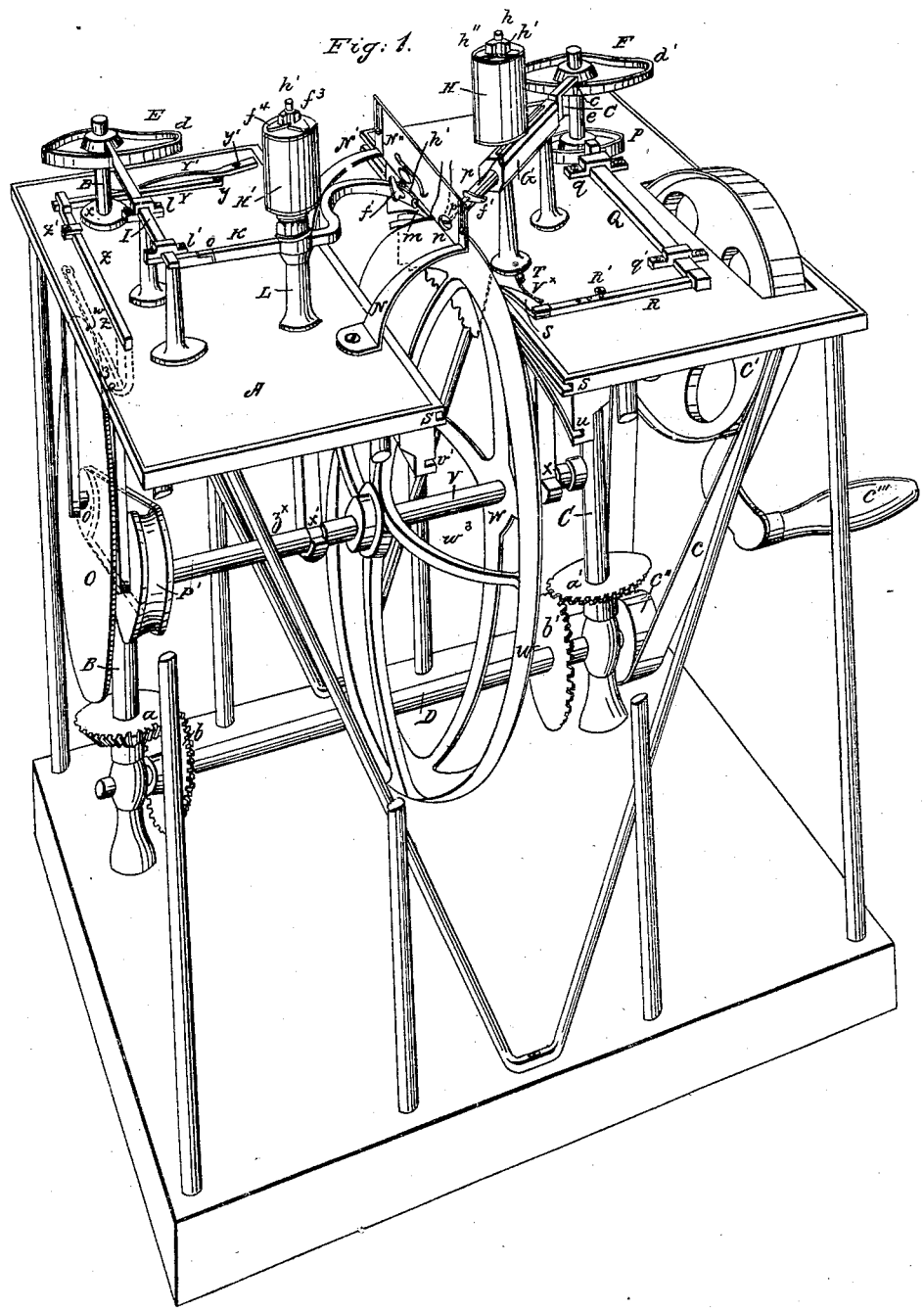

UNITED STATES PATENT OFFICE.

WILLIAM H. JOHNSON, OF GRANVILLE, MASSACHUSETTS.

IMPROVEMENT IN FEEDING-CLAMPS FOR SEWING-MACHINES.

Specification forming part of Letters Patent No. 9,665, dated April 12, 1853.

*To all whom it may concern:*

Be it known that I, WILLIAM H. JOHNSON, of Granville, in the county of Hampden and State of Massachusetts, have invented new and useful Improvements in Sewing-Machines; and I do hereby declare that the following is a full, clear, and exact description of the construction and operation of the same, reference being had to the annexed drawing, forming part of this specification, which represents a perspective view of the sewing-machine invented by me, and assigned to W. G. Bates, of Westfield, Massachusetts, together with the improvements referred to in this application.

My invention consists in the construction of a hollow rotary clamp composed of two skeleton disks or shells, meeting closely at their perimeters, so that the cloth can be folded in the interior of the clamp, while the seam is arranged around the edge, this clamp being so operated as to render the machine self-feeding.

The drawing will show the character of the machine to which my improvements are applicable, it having been invented by me and assigned to W. G. Bates, as aforesaid, the principle features necessary for us here to notice being the attachment of one needle, $n$, to the extremity of the reciprocating bar $f$, working in the guide G, and the insertion of the other needle, $m$, in the extremity of the lever K, which has its fulcrum in the axis of the support L.

Upon the reciprocating bar $f$ is erected the stud $h$, working in the slot $g$, and over this stud is placed the spool H, for supplying the needle $n$ with thread, the revolution of the spool being regulated by the pressure of the nut $h^3$ upon the spring $h^4$, the extremity of the stud $h$ being cut into a screw for that purpose. Upon the support L, and in the axis of the lever K, is the stud $h'$, over which is passed the spool H', its revolution being regulated by the nut $f^3$ and spring $f^4$, in the same manner as the spring and nut of the spool H. The position of the spool H on the reciprocating bar $f$, and that of H' on the axis of the vibrating lever K, admits of the uniform unwinding of the thread without any jerk, thus diminishing the risk of breaking the thread. The nuts $h^3$ $f^3$ and springs $h^4$ $f^4$ tighten the spools upon the studs $h$ and $h'$, so that the thread shall be given off with the desired facility for the purpose of supplying the needles.

The circular clamp consists of two skeleton concave disks, W W', upon an axle, V, these disks being in close contact along their perimeters. The disk W is fastened to the axle by a wedge, on removing which the disks can be separated for arranging the material around the edges of the clamp for sewing. The axle of the clamp rests in the bearings X X', and is connected at $z^x$ by a tenon with the extremity of the axle of the wheel P', to which motion is communicated in the following manner:

Upon the vertical shaft B, and under the cam E, is the small cam X, which works against the lever Y. This lever has its fulcrum at $y$, and is pressed against the cam X by the strong spring Y', fastened to the frame A at $y'$. Attached to the arm of this lever is the reciprocating bar Z, working in the guide Z' and the slot Z" in the frame A. Upon the extremity of this bar, which passes into the slot Z", is the dog $z$, working in the edge of the ratchet-wheel O. On the axle of this wheel is the pulley O', connected by a band with the wheel P', giving motion to the circular clamp W W'.

When the machine is in motion, the lever Y alternately rises and falls as it presses against that part of the cam X farther from or nearer to the shaft B. As the lever rises, it pulls the reciprocating bar Z with it, which, by reason of its connection with the dog $z$, presses it forward, causing the ratchet-wheel O to turn sufficiently to give the proper motion to the perimeter of the rotary clamp. As the lever Y falls, it presses the bar Z back, causing the dog $z$ to slip back one tooth of the ratchet-wheel O. When the lever rises, the ratchet-wheel is again pressed forward, and so continues to turn as long as the machine is in motion. The diameter of the rotary concave clamp can be varied, and in the working-machine the bearings on which its axle rests are made movable, so as to accommodate clamps of different diameters.

The advantage of the rotary hollow clamp is the facility with which work can be arranged for sewing, the concavity $W^3$, serving to hold the folds of the material, allowing the seam to appear along the edge of the clamp. By its use seams composed of one straight and one curved edge, two curved edges, irregular edges, or hollow and round edges in the making of a garment can be formed with the utmost facility, as the interior of the clamp will hold the fullness of the article, while the edge of the clamp will clinch and hold firmly that portion of the cloth where the stitch is to be made. This advantage is due entirely to the peculiar hollow and circular shape of the clamp which holds the fullness of the materials, and permits the operator to properly adjust the work by putting his hand in the interior of the clamp.

What I claim as my invention, and desire to secure by Letters Patent, is—

The use of a hollow rotary clamp, W W', as described, for holding and feeding cloth or other materials to be sewed, substantially as specified.

In testimony whereof I have hereunto subscribed my name before two subscribing witnesses.

WM. H. JOHNSON.

Witnesses:
   WM. P. ELLIOT,
   I. S. SNOOK.